US010013241B2

(12) United States Patent
Bleizeffer et al.

(10) Patent No.: US 10,013,241 B2
(45) Date of Patent: *Jul. 3, 2018

(54) OBJECT AND CONNECTION ORGANIZATION IN A DIAGRAM

(71) Applicant: International Business Machines Corporation, Armonk, NY (US)

(72) Inventors: Terry M. Bleizeffer, Durham, NC (US); Nicholas C. Hawkes, Markham (CA); Aimin Wu, Woodbridge (CA)

(73) Assignee: International Business Machines Corporation, Armonk, NY (US)

(*) Notice: Subject to any disclaimer, the term of this patent is extended or adjusted under 35 U.S.C. 154(b) by 464 days.

This patent is subject to a terminal disclaimer.

(21) Appl. No.: 14/065,845

(22) Filed: Oct. 29, 2013

(65) Prior Publication Data

US 2014/0282028 A1     Sep. 18, 2014

Related U.S. Application Data

(63) Continuation of application No. 13/834,542, filed on Mar. 15, 2013.

(51) Int. Cl.
  *G06F 3/00* (2006.01)
  *G06F 8/34* (2018.01)
  (Continued)

(52) U.S. Cl.
  CPC .............. *G06F 8/34* (2013.01); *G06F 3/048* (2013.01); *G06F 3/04817* (2013.01)

(58) Field of Classification Search
  CPC ........................ G06F 3/048; G06F 3/04817
  See application file for complete search history.

(56) References Cited

U.S. PATENT DOCUMENTS 5,432,897 A * 7/1995 Tatsumi ................ G06T 11/206
                                                  345/440
5,742,284 A * 4/1998 Duggan ............. G06F 3/04817
                                                  715/765
(Continued)

FOREIGN PATENT DOCUMENTS

CN      101216929       7/2008
CN      101617499      12/2009
(Continued)

OTHER PUBLICATIONS

"U.S. Appl. No. 13/834,542 First Action Pre Interview Summary", dated Sep. 1, 2015, 5 pages.
(Continued)

*Primary Examiner* — Kieu Vu
*Assistant Examiner* — Andrew Chung
(74) *Attorney, Agent, or Firm* — DeLizio Law, PLLC

(57) ABSTRACT

A method includes presenting, on a display, a diagram. The presenting of the diagram includes presenting a first row that defines a location where objects of a first object type can be created, wherein a first ghosted object of a first object type is displayed in the first row. The first ghosted object represents a first creatable object of the first object type. The presenting of the diagram includes presenting a second row that defines a location where objects of a second object type can be created. The method also includes responsive to a first input to create a first object of the first object type in the first row, creating the first object of the first object type. Also in response to the first input, the method includes graphically changing the first ghosted object into the first object and presenting a second ghosted object of the second object type in the second row.

6 Claims, 5 Drawing Sheets

(51) Int. Cl.
*G06F 3/048* (2013.01)
*G06F 3/0481* (2013.01)

(56) References Cited

U.S. PATENT DOCUMENTS

| | | | |
|---|---|---|---|
| 5,786,816 A * | 7/1998 | MacRae | G06F 19/325 |
| | | | 128/920 |
| 5,943,050 A * | 8/1999 | Bullock | H04N 5/232 |
| | | | 348/211.8 |
| 6,002,399 A | 12/1999 | Haine et al. | |
| 6,687,485 B2 * | 2/2004 | Hopkins | G09B 5/00 |
| | | | 434/118 |
| 6,836,275 B1 | 12/2004 | Arquie et al. | |
| 7,148,892 B2 * | 12/2006 | Robertson | G06T 15/20 |
| | | | 345/156 |
| 2004/0059816 A1 | 3/2004 | Takaoka et al. | |
| 2004/0189717 A1 * | 9/2004 | Conally | G06F 3/0481 |
| | | | 715/853 |
| 2005/0188302 A1 * | 8/2005 | Julitz | G06F 17/24 |
| | | | 715/251 |
| 2006/0271884 A1 * | 11/2006 | Hurst | G06F 17/30716 |
| | | | 715/854 |
| 2007/0036403 A1 | 2/2007 | Albertson et al. | |
| 2009/0249213 A1 | 10/2009 | Murase et al. | |
| 2010/0142409 A1 | 6/2010 | Fallon et al. | |
| 2011/0016429 A1 * | 1/2011 | Yoshihama | G06F 17/30899 |
| | | | 715/838 |
| 2011/0209094 A1 * | 8/2011 | Gasn | G06F 17/30365 |
| | | | 715/843 |
| 2011/0282873 A1 * | 11/2011 | Mirus | G06F 17/30873 |
| | | | 707/737 |
| 2014/0067406 A1 | 3/2014 | Hyatt et al. | |
| 2014/0282026 A1 | 9/2014 | Bleizeffer et al. | |

FOREIGN PATENT DOCUMENTS

| | | |
|---|---|---|
| CN | 102257472 | 11/2011 |
| CN | 102907069 | 1/2013 |

OTHER PUBLICATIONS

U.S. Appl. No. 13/834,542, filed Mar. 15, 2013, Bleizeffer, Terry M., et al.
"U.S. Appl. No. 13/834,542 First Action Summary Office Action", dated Feb. 5, 2016, 18 pages.
"CN Application No. 201410098139.4 Office Action", dated Jun. 24, 2016, 5 pages.
"U.S. Appl. No. 13/834,542 Office Action", dated Feb. 7, 2017, 16 pages.
"U.S. Appl. No. 13/834,542 Final Office Action", dated Jul. 13, 2017, 20 pages.

* cited by examiner

800

| HYPERVISORS | | | |
|---|---|---|---|
| Name | Networks | Type | Status |
| Hypervisor #1 | 1 | VMware ESX | Ready |
| Hypervisor #2 | 4 | VMware ESX | Missing Network |
| Hypervisor #3 | 2 | VMware ESX | Ready |

OBJECT AND CONNECTION ORGANIZATION IN A DIAGRAM

RELATED APPLICATIONS

This application is a Continuation of and claims the priority benefit of U.S. application Ser. No. 13/834,542 filed Mar. 15, 2013.

BACKGROUND

Embodiments of the inventive subject matter generally relate to the field of computers, and, more particularly, to organization of objects and connections in a diagram.

There are a number of approaches that allow users to create a diagram of multiple, interconnected objects. Some conventional approaches include standard canvas and palette design patterns. However, these current approaches have a number of drawbacks. For example, initially the canvas is blank, thereby providing no guidance on where the user should begin. Also, the relationship between two different types of objects may be not apparent. Additionally, with these conventional approaches, a user may need to attempt to create a connection between two objects to see if a connection is even possible. The creating of the connection between two objects may be a separate step. Also with these conventional approaches, the canvas may be free form, thereby making the diagrams difficult to read because only the object icons provide visual distinction between different types of objects.

SUMMARY

In some embodiments, a method includes presenting, on a display, a diagram. The presenting of the diagram includes presenting, on the display, a first row that defines a location where objects of a first object type can be created, wherein a first ghosted object of a first object type is displayed in the first row. The first ghosted object represents a first creatable object of the first object type. The presenting of the diagram includes presenting, on the display, a second row that defines a location where objects of a second object type can be created. The method also includes responsive to a first input to create a first object of the first object type in the first row, creating the first object of the first object type. Also in response to the first input, the method includes graphically changing the first ghosted object into the first object. Also in response to the first input, the method includes presenting, on the display, a second ghosted object of the second object type in the second row, wherein the second ghosted object represents a second creatable object of the second object type. Additionally, in response to the first input, the method includes presenting, on the display, a first ghosted connection between the first object and the second ghosted object.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to objects related to a network, embodiments are applicable to any type of objects that includes connections between for defining relationships. In other instances, well-known instruction instances, protocols, structures and techniques have not been shown in detail in order not to obfuscate the description.

Some embodiments present, on a display, a diagram (e.g., a topographical diagram) that defines a number of objects of different object types and relationships among the number of objects. In some embodiments, the diagram includes a number of swimlane rows for specific object types. Accordingly, each row can display a specific object type. Therefore, there can be a one-to-one relationship between the number of rows and the number of object types can be displayed in the diagram. Also in some embodiments, to assist the user in understanding the connectability among object types, an object that can be created (a ghosted object) in one row can be shown as connectable with an object in another row. This ghosted connection between a ghosted object in one row and an object in another row shows a clear relationship between the object and an object that can be created (the ghosted object). These embodiments remove the need for a palette and do not require users to create connections between the objects. Also, such embodiments provide a clear initial guidance when creating a diagram and assist the user in developing an accurate mental model of the various object types.

Figure 1:
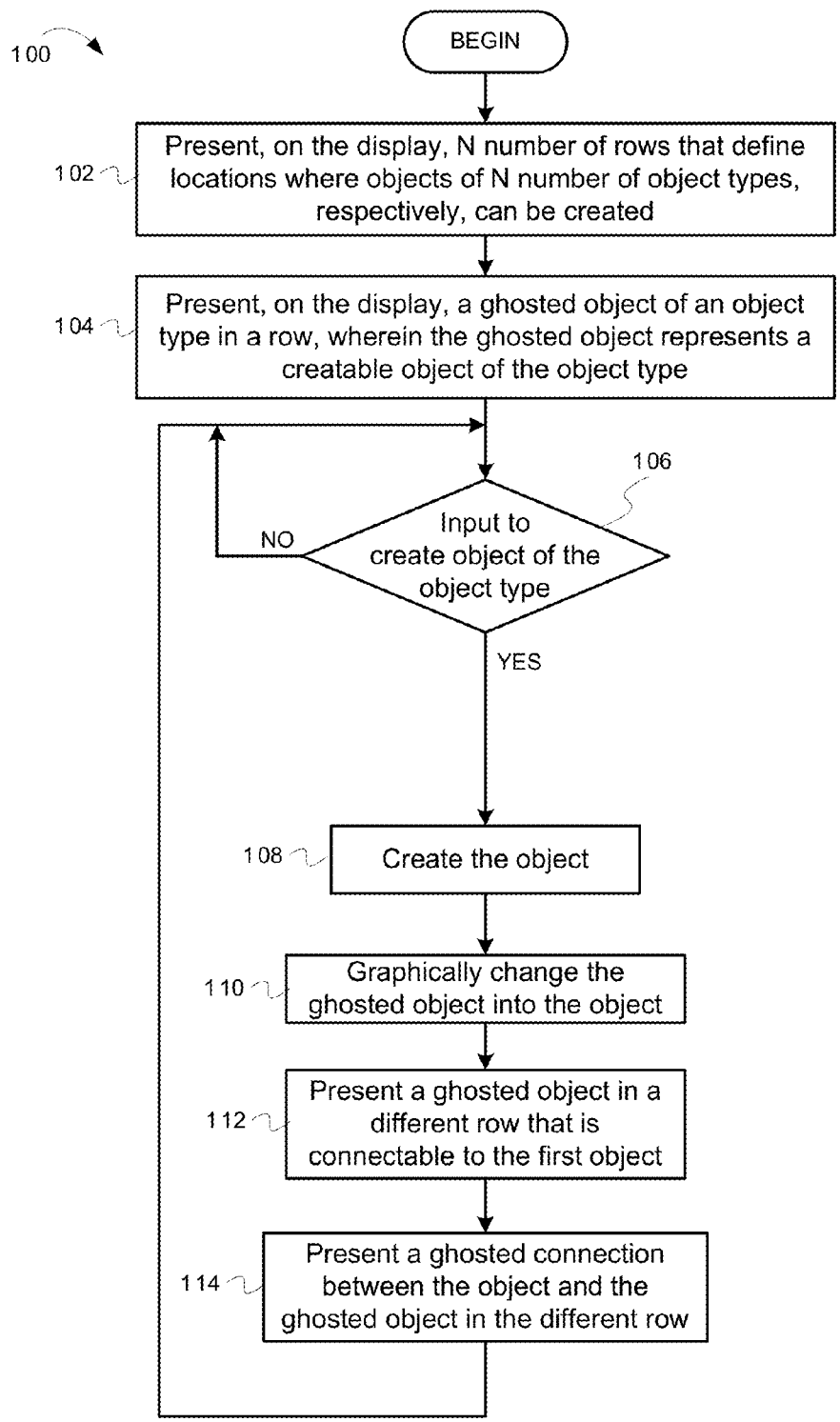
FIG. 1 depicts a flowchart for creating a diagram that includes objects and connections between the objects for defining relationships, according to some embodiments.
Figure 9:
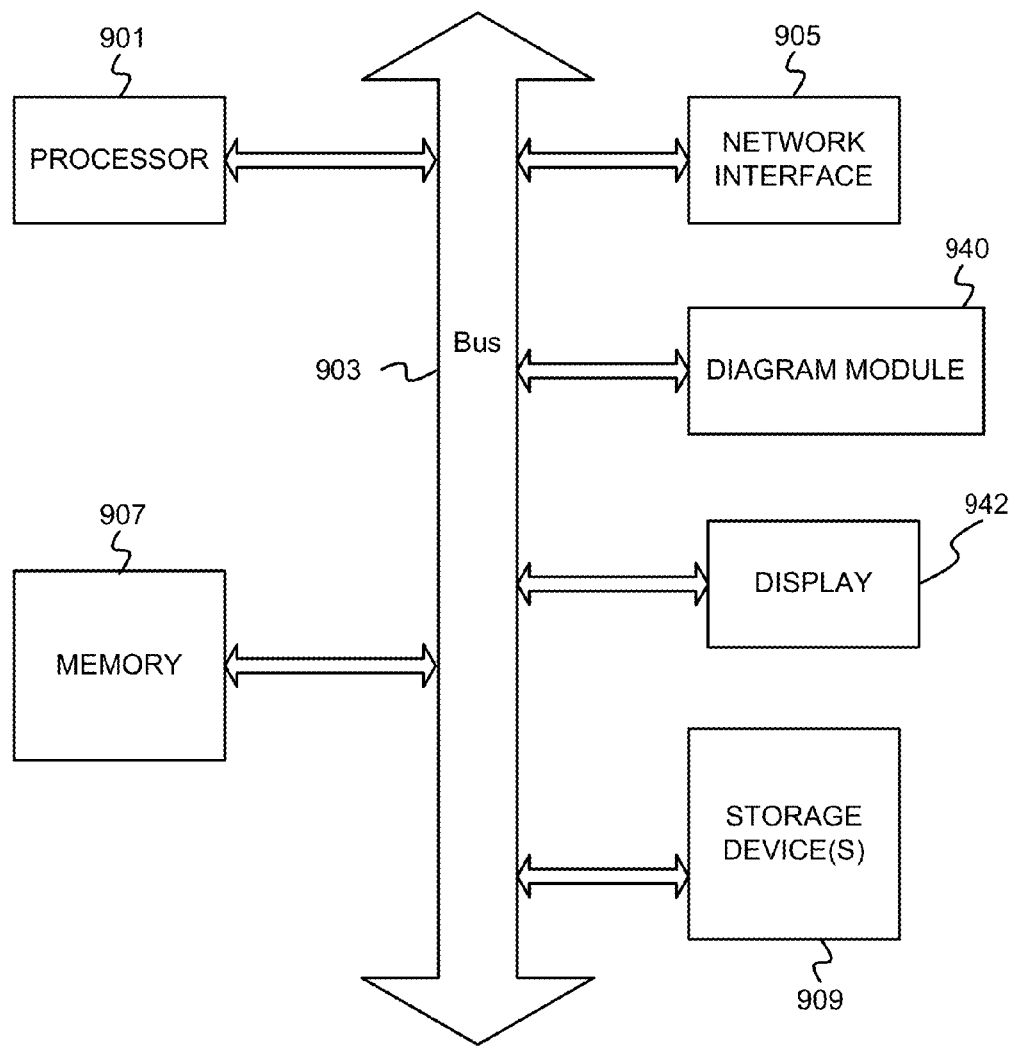
FIG. 9 depicts a computer system, according to some embodiments.

FIG. 1 depicts a flowchart for creating a diagram that includes objects and connections between the objects for defining relationships, according to some embodiments. A flowchart 100 of FIG. 1 is described in reference to the diagrams depicted in FIGS. 2-8. The operations of the flowchart 100 can be performed by software, firmware, hardware or a combination thereof. For the flowchart 100, the operations are described as being performed by a diagram module. An example of the diagram module is depicted in FIG. 9 (which is described in more detail below). The operations of a flowchart 100 start at block 102.

Figure 2:
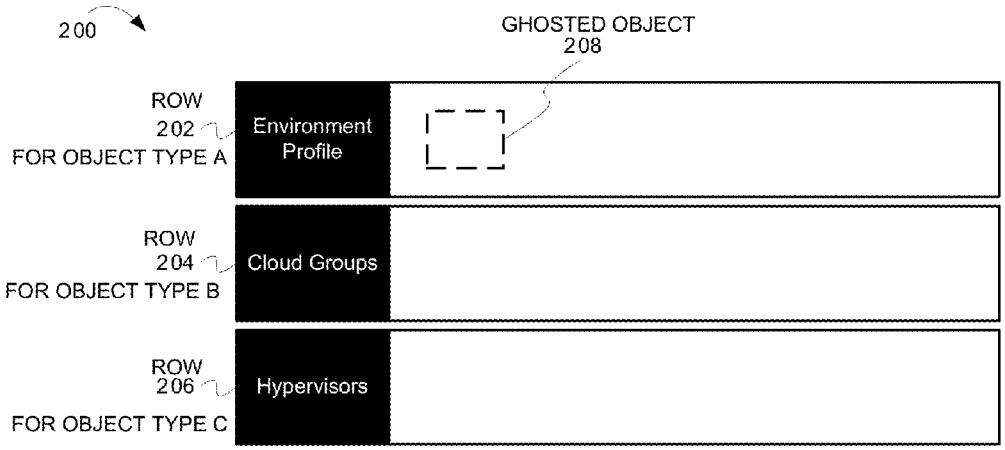
FIG. 2 depicts a diagram having a number of rows for different object types, according to some embodiments.

At block 102, a diagram module presents, on the display, N number of rows that define locations where objects of N number of object types, respectively, can be created. To help illustrate, FIG. 2 is now described. FIG. 2 depicts a diagram having a number of rows for different object types, according to some embodiments. The example object types in FIGS. 2-8 relate to network objects in a network (e.g., environments, clouds, hypervisors, etc.). However, embodiments are applicable to any type of objects. FIG. 2 depicts a diagram 200 that includes three rows. A row 202 is for an environment profile for a network and is for displaying objects of object type A (environment profile). A row 204 is for cloud groups for a network and is for displaying objects of object type B (cloud group). A row 206 is for hypervisors for a network and is for displaying objects of object type C (hypervisor). Operations of the flowchart 100 continue at block 104.

At block 104, the diagram module presents, on the display, a ghosted object of an object type in a row, wherein the ghosted object represents a creatable object of the object type. With reference to FIG. 2, a ghosted object 208 is displayed in the row 202. In some embodiments, a ghosted object is an object that can be created by a user. The ghosted objects (as described herein) provide guidance for the user in what objects can be created based on the objects currently being displayed in the diagram. Accordingly, the user can begin by creating an object of the object type A (environmental profile object). Also, while depicted as having a first ghosted object being displayed in the top row, in some embodiments, the first ghosted object can be displayed in any of the rows. Also, while depicted as only display one first ghosted object, in some embodiments, multiple first ghosted objects can be displayed in different rows. Operations of the flowchart 100 continue at block 106.

At block 106, the diagram module determines whether there is input to create an object of the object type for the ghosted object that is displayed. With reference to FIG. 2, in some embodiments, after clicking on a link below the ghosted object, a pop-up dialog allows the user to create the object. After the pop-up dialog, the newly created object is shown and additional objects can be created (as described below). If there is not input to create the object, operations of the flowchart 100 continue at block 106 to continue waiting. If there is input to create the object, operations of the flowchart 100 continue at block 108.

Figure 3:
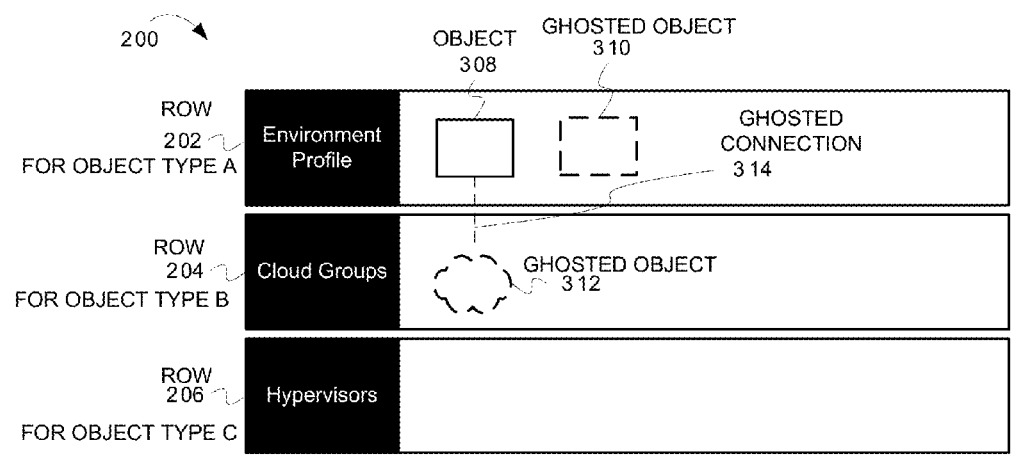
FIG. 3 depicts the diagram of FIG. 2 after a first object is created in a first row, according to some embodiments.

At block 108, the diagram module creates the object based on the ghosted object. To help illustrate, FIG. 3 is now described. FIG. 3 depicts the diagram of FIG. 2 after a first object is created in a first row, according to some embodiments. FIG. 3 depicts the diagram 200 after the ghosted object 208 shown in FIG. 2 is changed to an object 208. Therefore, a creatable object (the ghosted object 208) is changed to a created object (the object 208) based on input from the user to create the object. Operations of the flowchart 100 continue at block 110.

At block 110, the diagram module graphically changes the ghosted object into the object. With reference to FIGS. 2 and 3, the diagram module graphically changes the ghosted object 208 to the object 308. Operations of the flowchart 100 continue at block 112.

At block 112, the diagram module presents a ghosted object in a different row that is connectable to the first object. With reference to FIG. 3, the diagram module presents a ghosted object 312 in the row 204. The ghosted object 312 is displayed in response to the creation of the object 308 because the object 308 is connectable with an object of the object type B that is within the row 204. For this example, an environmental profile object is connectable to a cloud group object. Operations of the flowchart 100 continue at block 114.

At block 114, the diagram module presents a ghosted connection between the object and the ghosted object in the different row. With reference to FIG. 3, the diagram module presents a ghosted connection 314 to illustrate to the user that the object 308 can be connected to the ghosted object 312 after the user has changed the ghosted object 312 into an object. Also in this example, in response to creating the object 308 in the row 202, the diagram module presents a ghosted object 310 in the row 202. Accordingly, the user can create another object of the object type A. Of note, the object 308 is not connectable to the ghosted object 310. As described, all objects of a particular object type can be created in a same row. For example, an object type B is only created in the row 204 and cannot be created in the row 202 or the row 206.

Figure 4:
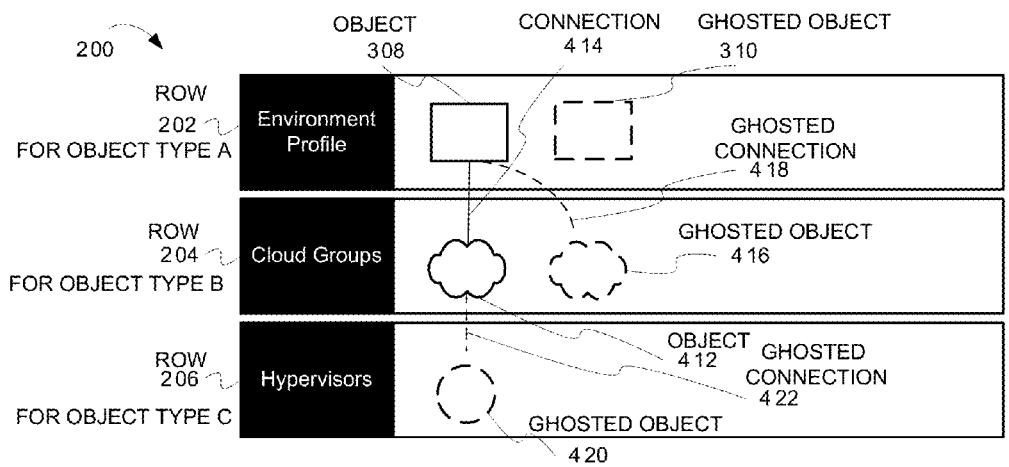
FIG. 4 depicts the diagram of FIG. 3 after a second object is created in a second row, according to some embodiments.

Operations of the flowchart 100 continue at block 106 where the diagram module waits for another input to create an object from a ghosted object. The operations at block 106-114 can continue until the diagram 200 is complete or the user terminates operations by the diagram module. To help illustrate, FIG. 4 is now described. FIG. 4 depicts the diagram of FIG. 3 after a second object is created in a second row, according to some embodiments. FIG. 4 depicts the diagram 200 after the ghosted object 312 shown in FIG. 3 is changed to an object 412. Therefore, a creatable object (ghosted object 312) is changed to a created object (the object 412) based on input from the user to create the object. With reference to FIGS. 3 and 4, the diagram module graphically changes the ghosted object 312 to the object 412.

Also, the diagram module presents a ghosted object 420 in the row 206. The ghosted object 420 is displayed in response to the creation of the object 412 because the object 412 is connectable with an object of the object type C that is within the row 206. For this example, a cloud group object is connectable with a hypervisor object.

Additionally, the diagram module presents a ghosted connection 422 to illustrate to the user that the object 412 can be connected to the ghosted object 420 after the user has changed the ghosted object 420 into an object. Also in this example, in response to creating the object 412 in the row 204, the diagram module presents a ghosted object 416 in the row 204. Accordingly, the user can create another object of the object type B. Of note, the object 412 is not connectable to the ghosted object 416. While illustrated that objects are connected and connectable to objects in adjacent rows below, some embodiments are not so limited. For example, in some embodiments objects are connected or connectable with objects in non-adjacent rows and/or connected or connectable to objects in rows above. Also, while these structures that are defined for a specific object type are depicted as swimlane rows, some embodiments can include other types of structures for specific object types (e.g., swimline columns).

Figure 5:
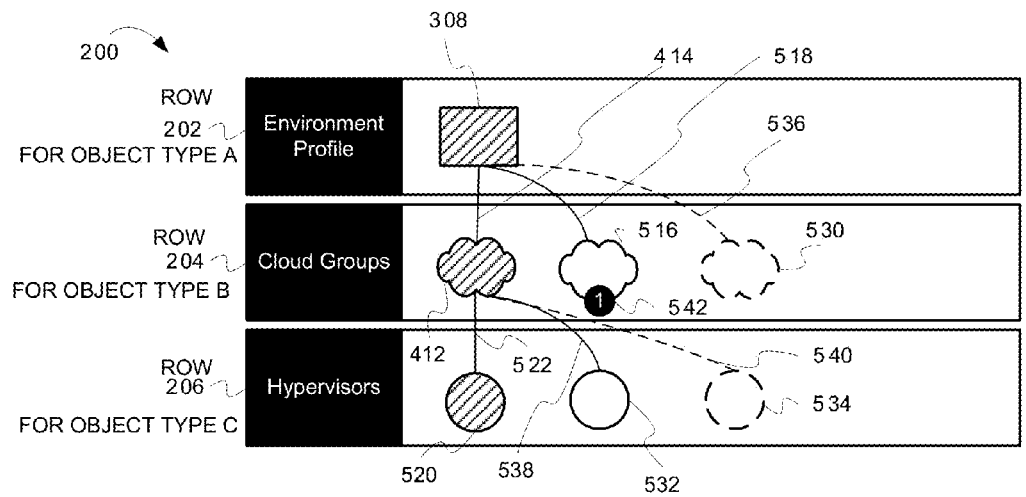
FIG. 5 depicts a diagram having a number of objects and connections based on selection of a first object, according to some embodiments.
Figure 6:
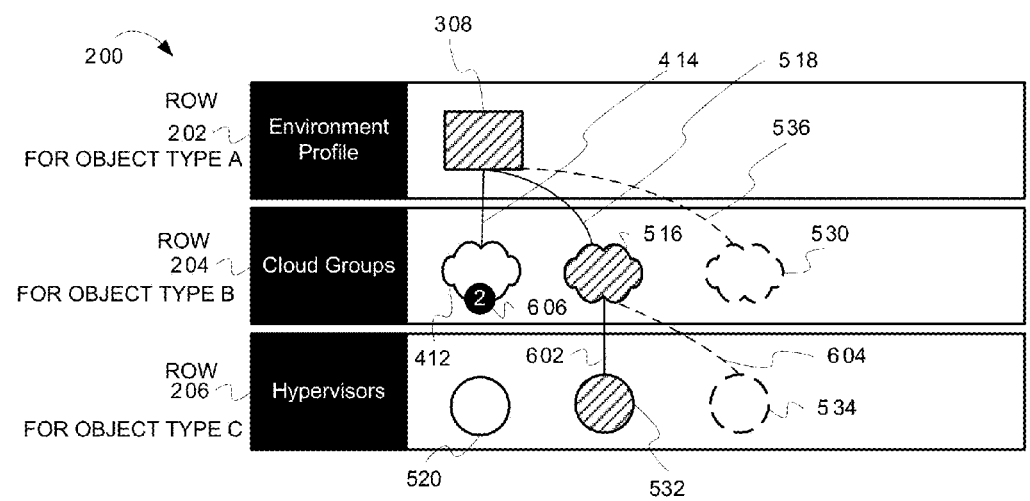
FIG. 6 depicts the diagram of FIG. 5 after a different object is selected, according to some embodiments.

Some diagrams can have multiple objects of each object type. To help illustrate, FIGS. 5-6 are now described. FIG. 5 depicts a diagram having a number of objects and connections based on selection of a first object, according to some embodiments. FIG. 5 depicts the diagram of FIG. 4 after a second object is created in the row 204 and a second object is created in the row 206. In particular, the object 516 is created adjacent to the object 412 in the row 204. The objects 412 and 516 can represent different cloud group objects. FIG. 5 depicts the diagram 200 after the ghosted object 416 shown in FIG. 4 is changed to the object 516. Therefore, a creatable object (ghosted object 416) is changed to a created object (the object 516) based on input from the user to create the object. With reference to FIGS. 4 and 5, the diagram module graphically changes the ghosted object 416 to the object 516. Also in this example, in response to creating the object 516 in the row 204, the diagram module presents a ghosted object 530 in the row 204. Accordingly, the user can create another object of the object type B. Also, an object 532 is created adjacent to an object 520 in the row 206. The objects 520 and 532 can represent different hypervisor objects. Also in this example, in response to creating the object 532 in the row 206, the diagram module presents a ghosted object 534 in the row 206. Accordingly, the user can create another object of the object type C.

Also as shown in FIG. 5, an object in each row can be selected. In this example, the object 308 is selected for the row 202. The object 412 is selected for the row 204. The object 520 is selected for the row 206. As shown, for the selected objects in a row, the connections and the ghosted connections are shown. For the unselected objects in a row, the connections and ghosted connections below the unselected objects are not shown. Rather, for the unselected objects, a circled number is positioned below the unselected object. The circled number represents the number of connections that the object is connected in the row below.

To illustrate in FIG. 5, the object 308 in the row 202 is selected. Therefore, the connection 414 between the object 308 and the object 412 is shown. Also, a connection 518 between the object 308 and the object 516 is shown. Additionally, a ghosted connection 536 is shown between the object 308 and the ghosted object 530. In the row 204, the object 412 is selected. Therefore, a connection 522 between the object 412 and the object 520 is shown. Also, a connection 538 between the object 412 and the object 532 is shown. Additionally, a ghosted connection 536 is shown between the object 308 and the ghosted object 530. In the row 206, the object 520 is selected. Therefore, a connection 522 between the object 412 and the object 520 is shown. Also, a connection 538 between the object 412 and the object 532 is shown. Additionally, a ghosted connection 540 is shown between the object 412 and the ghosted object 534. In the row 206, the object 520 is selected. However, in this example there is not a row below the row 206 for another object type. Therefore, no connections or ghosted connections are shown for the object 520. Also depicted in FIG. 5, a circled number 542 is positioned below the unselected object 516 in the row 204. The circled number 542 has a value of one, which represents the number of connections that the unselected object has with objects in the row 206.

Therefore, even though the connections are not shown for the unselected object 516, the user is able to see the number of connections for unselected object 516. Such embodiments enable the diagram 200 to provide information about the relationships among the objects without displaying all of the connections at a same time. To illustrate, FIG. 6 depicts the diagram of FIG. 5 after a different object is selected, according to some embodiments. FIG. 6 depicts how the diagram 200 changes in response to the user selecting a different object. In this example, the user has selected the object 516. Therefore, the object 412 is unselected.

In response to the selection by the user, the connections and ghosted connections for the row 204 are updated. In particular, the connection 522, the connection 538, and the ghosted connection 540 for the object 412 (that were depicted in FIG. 5 for the object 412) are removed in FIG. 6. Also, the connections and ghosted connections for the selected object (the object 516) are displayed. In particular, the display module adds a connection 602 from the object 516 to the object 532. The display module also adds a ghosted connection 604 from the object 516 to the ghosted object 534.

Also in response to the selection by the user, the circled number 542 is removed, thereby being replaced with the connections and ghosted connections for the object 516 because the object 516 is now selected. Also depicted in FIG. 6, a circled number 606 is positioned below the unselected object 412 in the row 204. The circled number 606 has a value of two, which represents the number of connections that the unselected object has with objects in the row 206. Therefore, even though the connections are not shown for the unselected object 412, the user is able to see the number of connections for unselected object 412.

Figures 7, 8:
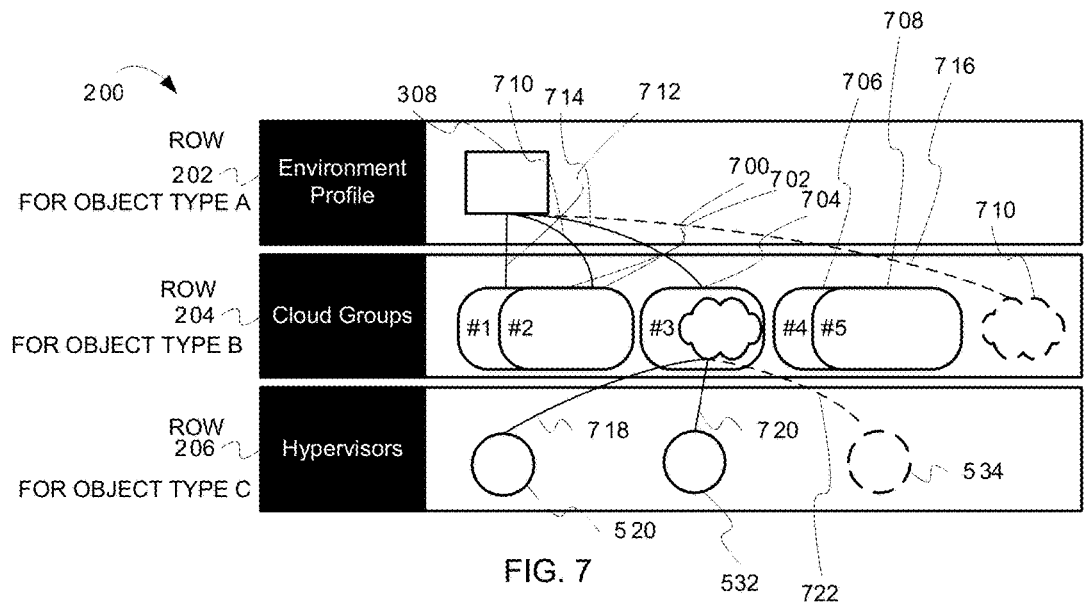
FIG. 7 depicts a diagram having a number of objects and connections and including card flipping for presenting objects in a row, according to some embodiments.
FIG. 8 depicts a grid view for detailing objects of a particular object type, according to some embodiments.

For increased scalability, the rows of the diagram 200 can include card-flipping for the different objects in a row. To illustrate, FIG. 7 depicts a diagram having a number of objects and connections and including card flipping for presenting objects in a row, according to some embodiments. FIG. 7 depicts the diagram 200 in which the row 204 includes card-flipping for representing the objects therein. The row 204 includes a card 700, a card 702, a card 704, a card 706, and a card 708. Each of the cards 700-708 includes an object of the object type B. The row 204 also includes a ghosted object 799. In this example, the card 704 is currently selected. The card 704 is fully displayed along with the object therein. The other cards are stacked on each other as shown. In response to the user selecting a different card in the row 204, that card is fully displayed while the other cards are stacked.

Because the card 704 is selected, its connections and ghosted connections to the objects in the row 206 are displayed. Therefore, the connections and ghosted connection for the object in the card 704 and the objects in the row 206 are displayed. The card 704 is connected to the object 520 through a connection 718. The card 704 is connected to the object 532 through a connection 720. Also, there is a ghosted connection 722 between the card 704 and the ghosted object 534. The diagram 200 also includes connections between the cards and the object 308 in the row 202. The object 308 is connected to the card 700 through a connection 712. The object 308 is connected to the card 702 through a connection 710. The object 308 is connected to the card 704 through a connection 714. Also, there is a ghosted connection 716 between the object 308 and the ghosted object 799.

While card flipping is only shown for one row, the card flipping can be incorporated into any number of rows in the diagram. In some embodiments, the displaying of the circled numbers illustrated in FIGS. 5-6 can be combined with the card flipping illustrated in FIG. 7. Accordingly, each of the cards that are not selected can include a circled number in or near the card that represents the number of connections to objects in the row below. Also, the cards can also display additional information. For example, the cards can include symbols that indicate whether additional configuration is necessary for the object and/or if there are any issues with the objects to which the object is connected.

In some embodiments, the diagram 200 can be switched to a standard grid view to show details for a particular object type. To illustrate, FIG. 8 depicts a grid view for detailing objects of a particular object type, according to some embodiments. FIG. 8 depicts a grid 800 that is displayed in response to a user selecting one of the rows of a particular object type. In this example, the user selected the row 206 to provide a more detailed grid view of each of the objects of the object type C (hypervisors). For example, the user can select a row to display in a grid view by selecting the name at the beginning of the row. In this example with reference to FIG. 7, the user could select the portion of the row 206 that includes the name of the object type—hypervisors.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 9 depicts a computer system, according to some embodiments. A computer system includes a processor 901 (possibly including multiple processors, multiple cores, multiple nodes, and/or implementing multi-threading, etc.). The computer system includes a memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, Hyper-Transport®, InfiniBand®, NuBus, etc.), a network interface 905 (e.g., an ATM interface, an Ethernet interface, a Frame Relay interface, SONET interface, wireless interface, etc.), and a storage device(s) YY09 (e.g., optical storage, magnetic storage, etc.). The computer system includes a display 942, which can be representative of a display to display the diagrams depicted in FIGS. 2-8 as described herein. The computer system also includes a diagram module 940 to creating and updating of the diagrams, as described herein. Some or all of the operations of the diagram module 940 may be implemented with code embodied in the memory and/or processor, co-processors, other cards, etc. Any one of these operations may be partially (or entirely) implemented in hardware and/or on the processor 901. For example, the operations may be implemented with an application specific integrated circuit, in logic implemented in the processor 901, in a co-processor on a peripheral device or card, etc.

Further, realizations may include fewer or additional components not illustrated in FIG. 9 (e.g., video cards, audio cards, additional network interfaces, peripheral devices, etc.). The processor 901, the storage device(s) 909, the network interface 905, the memory 907, the page turn module 940, and the display 942 are coupled to the bus 903. Although illustrated as being coupled to the bus 903, the memory 907 may be coupled to the processor 901.

While the embodiments are described with reference to various implementations and exploitations, it will be understood that these embodiments are illustrative and that the scope of the inventive subject matter is not limited to them. In general, techniques for organization of objects and connections in a diagram as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for displaying a diagram, the method comprising:

providing a user interface (UI) for organizing and creating the diagram utilizing a swim lane style row structure for representing types and relationships between different objects and for presenting ghosted objects for use in creation of new objects, wherein the UI further comprises:

presenting visible rows upon entry to the UI, wherein each row represents a specific object type, with a first ghosted object on a first row pre-connected with a selected first non-ghosted object from a second row using a first ghosted connection;

responsive to a user selection of the first ghosted object for creation, creating a second non-ghosted object to replace the first ghosted object and presenting a connection between the first non-ghosted object and the second non-ghosted object as a first non-ghosted connection; and responsive to a user selection of a third non-ghosted object in the same row as the first non-ghosted object, removing at least the second non-ghosted object and first non-ghosted connection, and displaying a number in proximity to the first non-ghosted object, the number representing a number of connections between the first non-ghosted object and a first set of one or more objects connected to the first non-ghosted object that were removed, and adding a second set of one or more objects connected to the third non-ghosted object and one or more connections to the second set of one or more objects.

2. The method of claim 1, further comprising, responsive to selection of the first ghosted object, presenting a menu including a menu entry, which upon selection, creates the second non-ghosted object.

3. The method of claim 1, further comprising, responsive to selection of a third object in a third row, automatically presenting one or more child objects of the third object.

4. The method of claim 1, further comprising providing a card flipping interface, wherein a row of the UI includes a plurality of non-ghosted objects included in the card flipping interface and at least one ghosted object excluded from the card flipping interface, the plurality of non-ghosted objects including a first selected object, wherein the card flipping interface includes fully displaying the first selected object as connected to the first ghosted object using the first ghosted connection, and partially displaying a remainder of the plurality of non-ghosted objects in at least one stack in the row and without any ghosted connections.

5. The method of claim 1, wherein the diagram represents a cloud environment.

6. The method of claim 1, wherein providing the UI for organizing and creating the diagram comprises providing the UI for organizing and creating a topographical diagram.

* * * * *